(12) United States Patent
Wu

(10) Patent No.: US 6,666,052 B1
(45) Date of Patent: Dec. 23, 2003

(54) AUTOMOBILE PEDAL LOCKSET WITH VERTICAL ENTRY

(75) Inventor: Chun-Hsien Wu, Tainan (TW)

(73) Assignee: Chia-Lin Chen, Taipei Hsien (TW)

( * ) Notice: Subject to any disclaimer, the term of this patent is extended or adjusted under 35 U.S.C. 154(b) by 0 days.

(21) Appl. No.: 10/241,776

(22) Filed: Sep. 12, 2002

(51) Int. Cl.[7] .............................................. B60R 25/00
(52) U.S. Cl. ........................................... 70/202; 70/237
(58) Field of Search .......................... 70/198–203, 237, 70/238, 254

(56) References Cited

U.S. PATENT DOCUMENTS

| | | | | |
|---|---|---|---|---|
| 5,906,121 A | * | 5/1999 | Mankarious | 70/199 |
| 6,089,055 A | * | 7/2000 | Vito | 70/202 |
| 6,298,696 B2 | * | 10/2001 | Vito | 70/202 |
| 6,439,013 B1 | * | 8/2002 | Chen | 70/202 |
| 6,463,772 B2 | * | 10/2002 | Vito | 70/201 X |
| 2001/0005997 A1 | * | 7/2001 | Vito | 70/202 |
| 2002/0014097 A1 | * | 2/2002 | Vito | 70/202 |

* cited by examiner

*Primary Examiner*—Lloyd A. Gall
(74) *Attorney, Agent, or Firm*—Rosenberg, Klein & Lee

(57) ABSTRACT

An automobile pedal lockset with vertical entry includes a lockset and a locking rod; a hollow primary and a secondary locking pipes being provided to the lockset; two slipways on opposite inner sides of the two locking pipes; two retainers at the lower end of both locking pipes; the locking rod in the primary locking pipe; a trough defined between both locking pipes connecting through two retainers to define a gap for direct entry of locking the lockset to a connection rod of brake pedal or clutch pedal to avoid impedance from other components in the car during the lateral operation of the lockset; walls on both sides of the slipways of both locking pipes; two circular channels on both sides of the stopper to hold against inner walls of the two circular channels of the stopper for both locking pipes to be firmly joined without being subject to forced open for burglar-proof results.

3 Claims, 6 Drawing Sheets

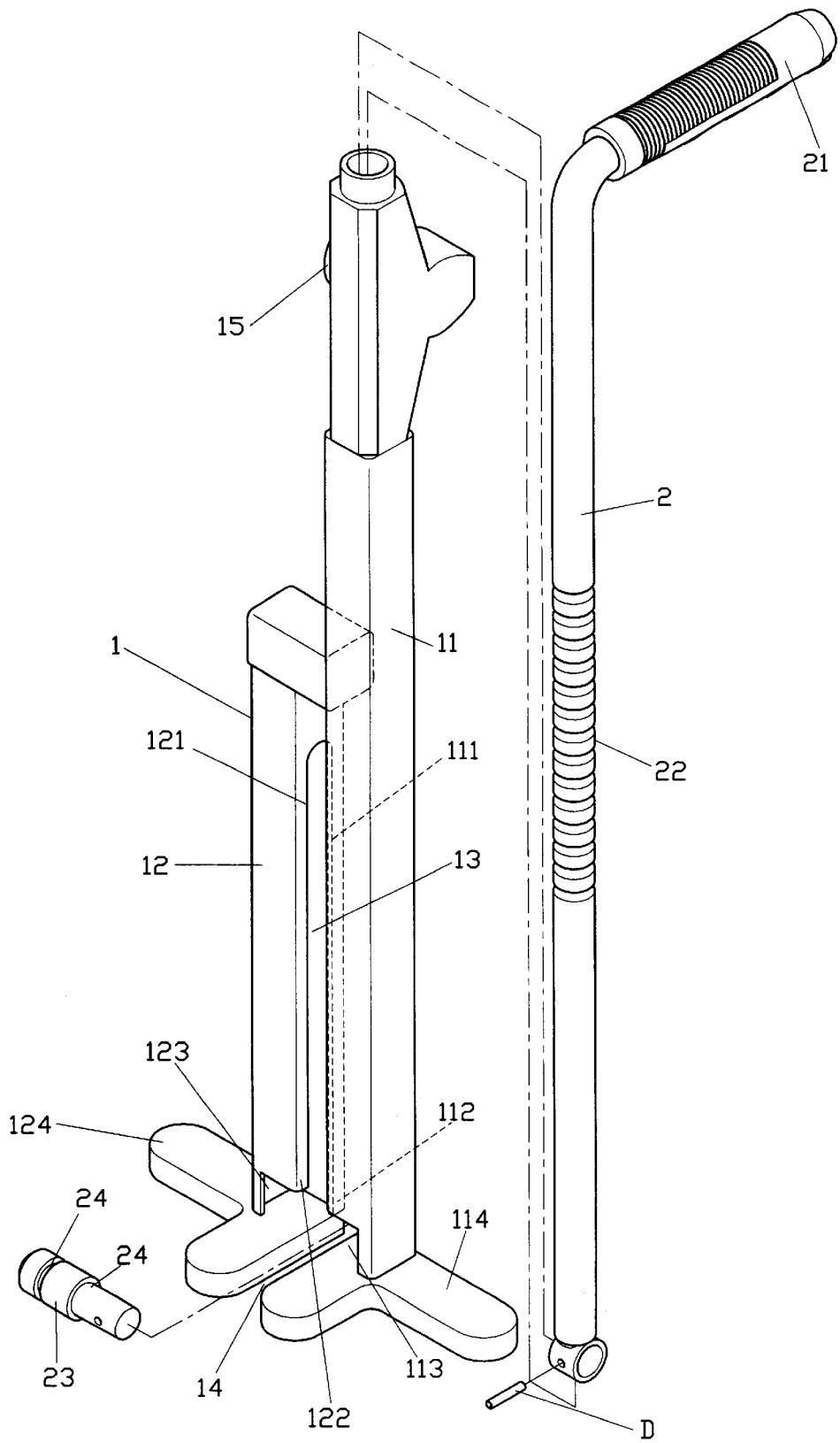
F I G . 1

Ｕ

US 6,666,052 B1

AUTOMOBILE PEDAL LOCKSET WITH VERTICAL ENTRY

BACKGROUND OF THE INVENTION (a) Field of the Invention

The present invention relates to an automobile pedal lockset with vertical entry, and more particularly, to one having a trough between a primary and a secondary locking pipe to connect through two retainers with a gap formed between the two retainers to be vertically locked onto a connection rod of a brake pedal in a smooth operation without impedance; and a stop wall being provided on both sides of the trough to be caulked into and held tightly against a circular channel each provided on both sides of a stopper to prevent forced opening to achieve burglar proof results.

(b) Description of the Prior Art

Along with the improved living standard, bicycles and motorcycles disappear or are used for sporting fun; automobile has become a popular commuting means. However, the rate of stolen cars also climbs up and naturally various types of locksets for different parts of the automobile are generally available in the market for burglar proof. Among them, a pedal lockset (A) designed to lock up a brake pedal (or a clutch pedal) as illustrated in FIG. 6 of the accompanying drawings, is essentially composed of a hollow primary locking pipe (A1) containing a locking rod (A2); a hollow secondary locking pipe (A3) is fixed to one side of the primary locking pipe (A1), and a trough (A4) to accommodate a connection rod (B1) of a brake pedal (B) is formed between the primary locking pipe (A1) and the secondary locking pipe (A3) and a gap (A5) is provided at the lower end of the secondary locking pipe (A3). In use, the gap (A5) of the secondary locking pipe (A3) is laterally moved to be locked onto the connection rod (B1) of the brake pedal (B) so to have the connection rod (B1) of the brake pedal (B) to be locked up in the trough (A4), and then the locking rod (A2) inside the primary locking pipe (A1) is pulled up for a stopper (A6) provided at the lower end of the locking rod (A2) to merely hold against the floor in the car, thus to prevent the car from being operated since it is impossible to depress the brake pedal (B). However, in using such a structure to lock up, the entire pedal lockset (A) has to be laterally moved so to lock onto the connection rod (B1) of the brake pedal (B). Since the space inside the car is very s confined, the lateral movement could be easily frustrated by contacting other components such as the throttle pedal (or clutch pedal) in the vicinity of the brake pedal (B). Therefore, it becomes rather awkward in the use of the pedal lockset. Furthermore, as the connection rod (B1) of the brake pedal (B) is locked up in the trough (A4) between the primary and the secondary locking pipes (A1, A3), the burglar could easily force to open up the secondary locking pipe (A3) using a tool such as a prying bar to stick into the trough (A4) with the primary locking pipe (A1) as a support. Therefore, the pedal lockset (A) is comparatively poor in stopping the burglar since it can be easily removed. The prior art also includes U.S. Pat. Nos. 5,471,855; 5,537,846; 5,715,710; 5,870,912; 5,881,587; 5,950,463; 5,979,197; 6,089,055; 6,192,724; and 6,298,696.

SUMMARY OF THE INVENTION

The primary purpose of the present invention is to provide a pedal lockset that can be vertically locked onto a connection rod of a brake rod (or a clutch rod) without being impeded by other components in a car while permitting a firm and sold connection of a primary locking pipe and a secondary locking pipe without being tampered by forced entry to assure of the burglar-proof results.

BRIEF DESCRIPTION OF THE DRAWINGS

FIG. 1 is an exploded view of the present invention.

DETAILED DESCRIPTION OF THE PREFERRED EMBODIMENTS

Figure 2:
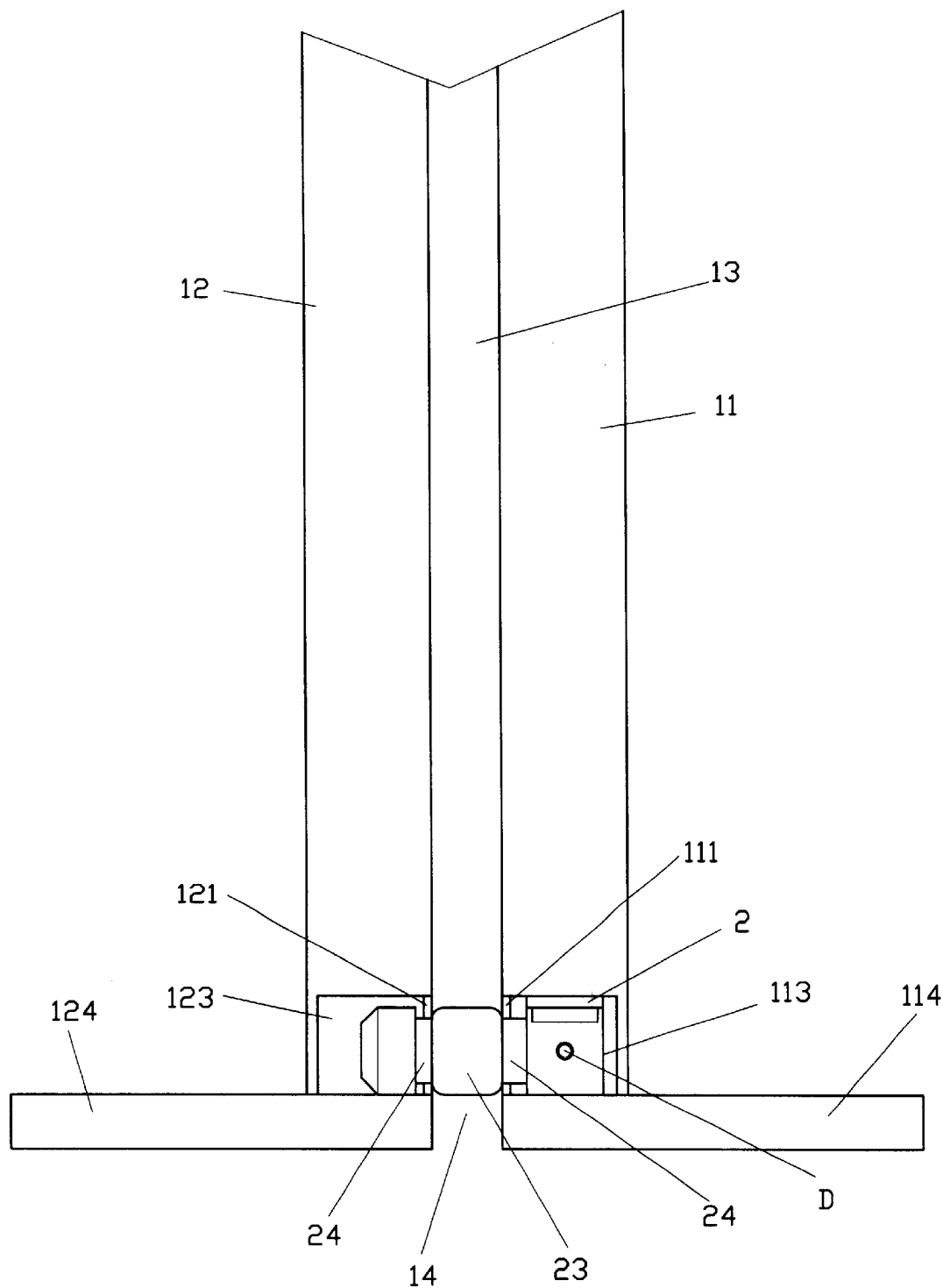
FIG. 2 is a view showing partially an assembly of the present invention.

Referring to FIGS. 1 and 2, the present invention essentially comprises a lockset (1) and a locking rod (2). The lockset (1) indicating an 'h' shape, contains a hollow primary locking pipe (11), a hollow secondary locking pipe (12) is fixed to one side of the primary locking pipe (11), and a trough (13) is formed between the primary and the secondary locking pipes (11, 12). Also referring to FIG. 3, a slipway (111, 121) connecting through the trough (13) is each provided on the opposite inner surfaces of the trough (13) by the primary and the secondary locking pipes (11, 12) and both sides of each of the two slipways (111, 121) are respectively disposed with a wall (112, 122). A gap (113, 123) is each laterally provided on one side to the lower end of the two slipways (111, 121). At the lower end each of the primary and the secondary locking pipes (11, 12) is fixed with a retainer (114, 124). A gap (14) is formed between the two retainers (114, 124) at the lower end of the trough (13) and a locking cylinder (15) connecting through the slipway (111) is disposed at the upper end of the primary locking pipe (11).

The locking rod (2) to be inserted into the primary locking pipe (11) and subject to one-way restriction by the locking cylinder (15) has provided at the top a handle (21), and a plurality of restriction slots (22) are provided in the middle section of the locking rod (2). A stopper (23) is fixed to the lower end of the locking rod (2), and a circular channel (24) is each provided on both sides of the stopper (23).

Figure 3:
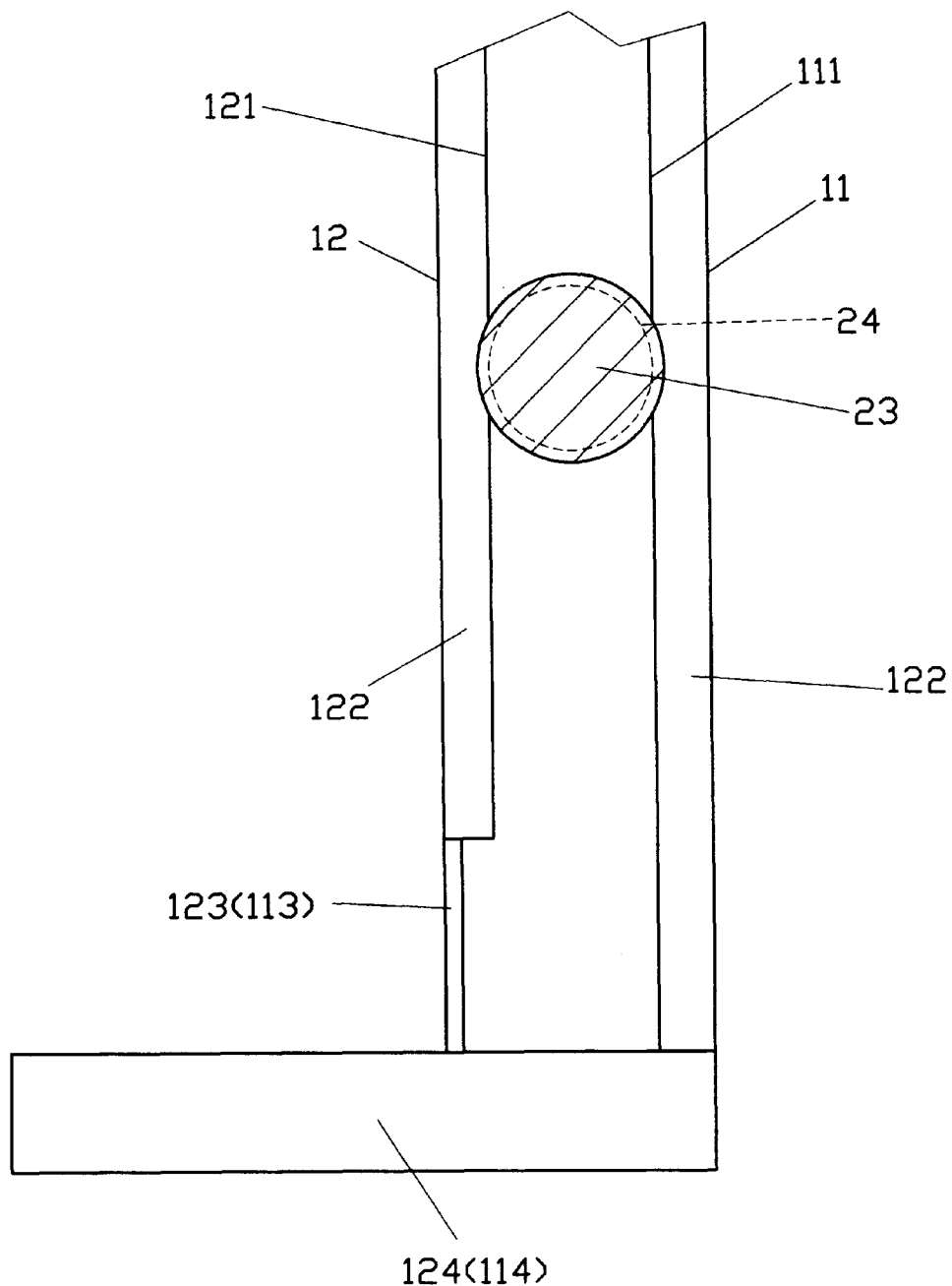
FIG. 3 is a sectional view of the present invention having the stopper caulked to a wall.

When assembled, the locking rod (2) is placed into the slipway (111) of the primary locking pipe (11) of the lockset (1). A pin (D) is used to secure the stopper (23) to the lower end of the locking rod (2) with the two circular channels (24) of the stopper (23) respectively caulked into the two walls (112, 122) on both sides of the slipways (111, 121) of the primary and the secondary locking pipes (11, 12) as illustrated in FIG. 3. Meanwhile, the stopper (23) has the two gaps (113, 123) located at the gap (14) at the lower end of the trough (13) to permit fast assembly of the lockset (1). Once the locking rod (2) is pulled up or down, the stopper (23) also moves up or down accordingly while both circular channels (24) of the stopper (23) are restricted to only move between the two walls (112, 122) on both sides of the slipways (111, 121).

Figure 4:
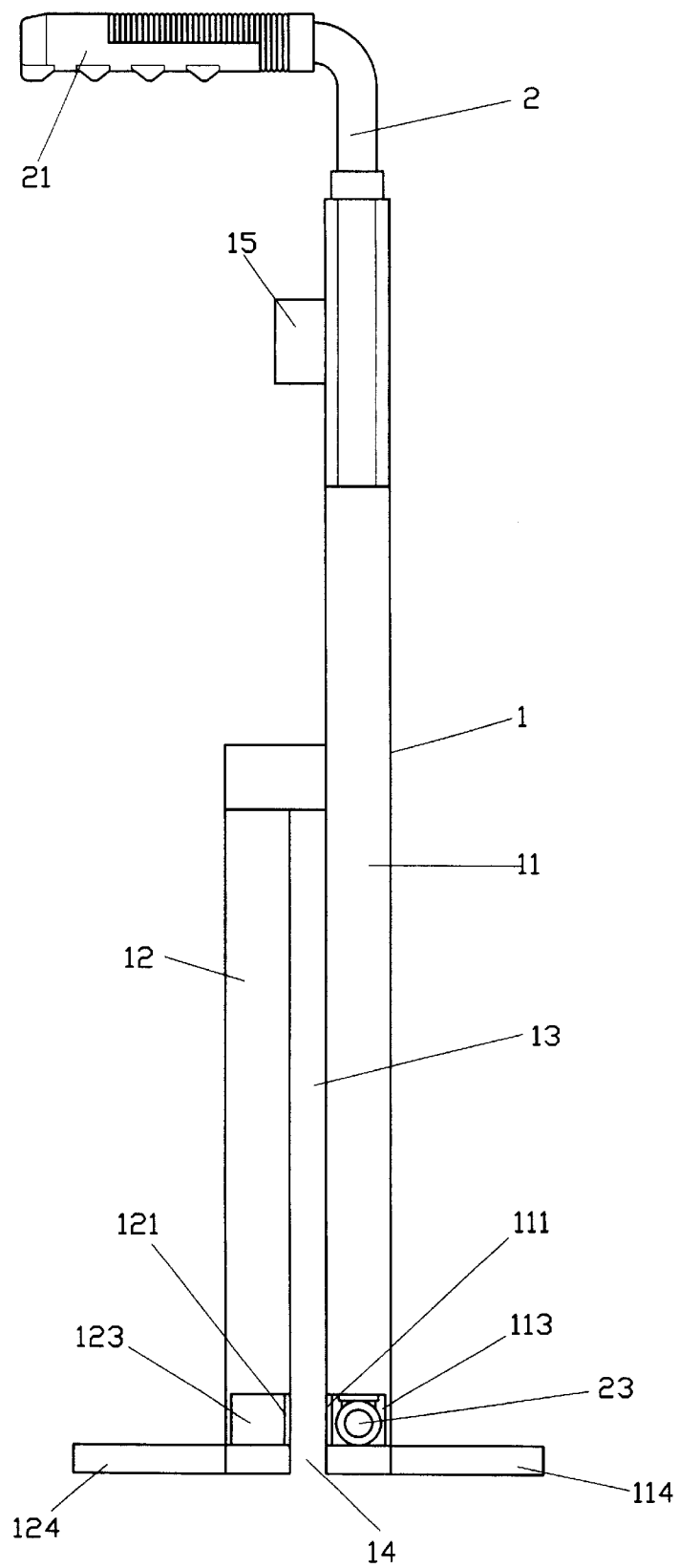
FIG. 4 is a view showing a turning of a locking rod of the present invention.
Figure 5:
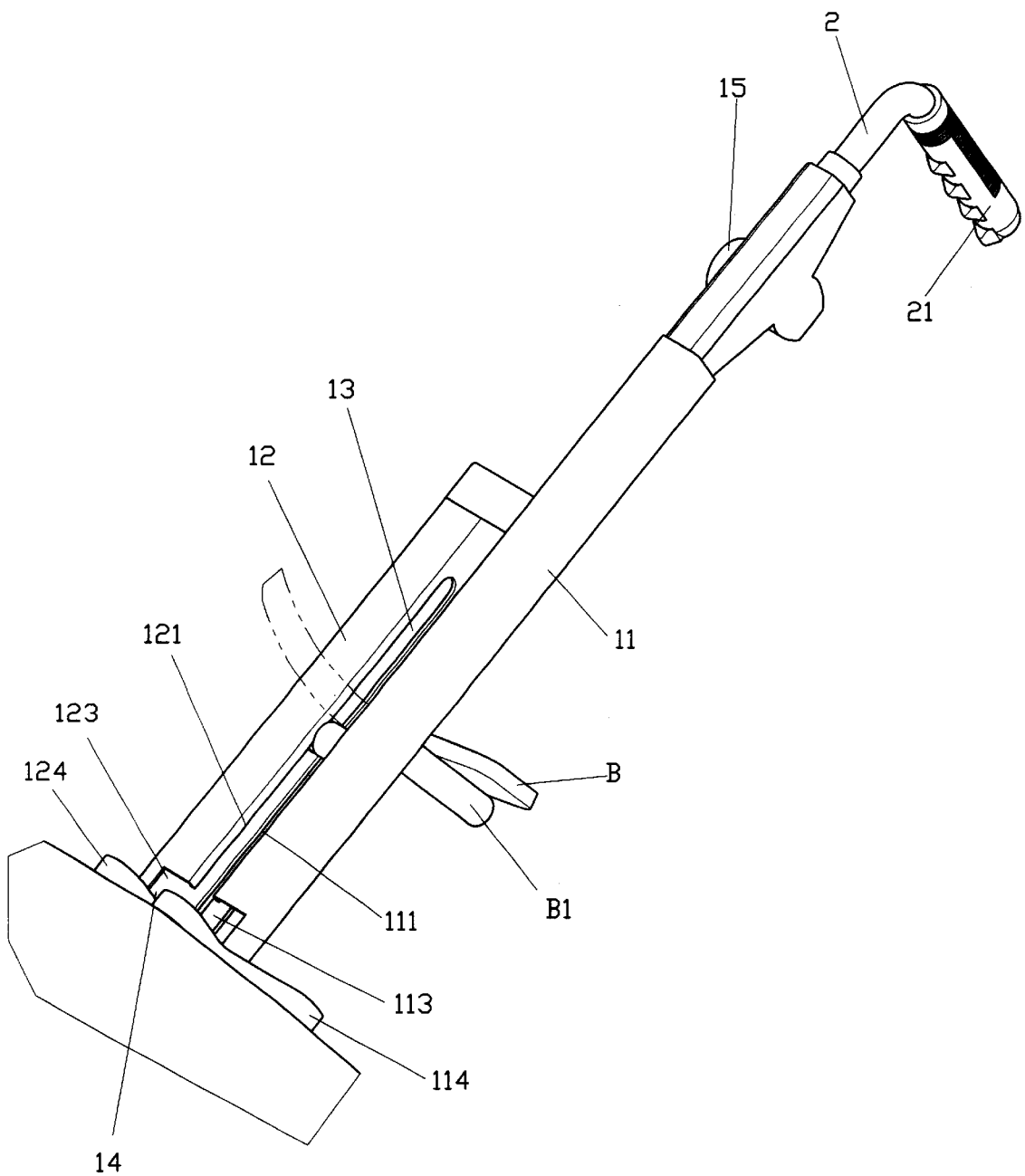
FIG. 5 is a view showing the operation of the present invention.
Figure 6:
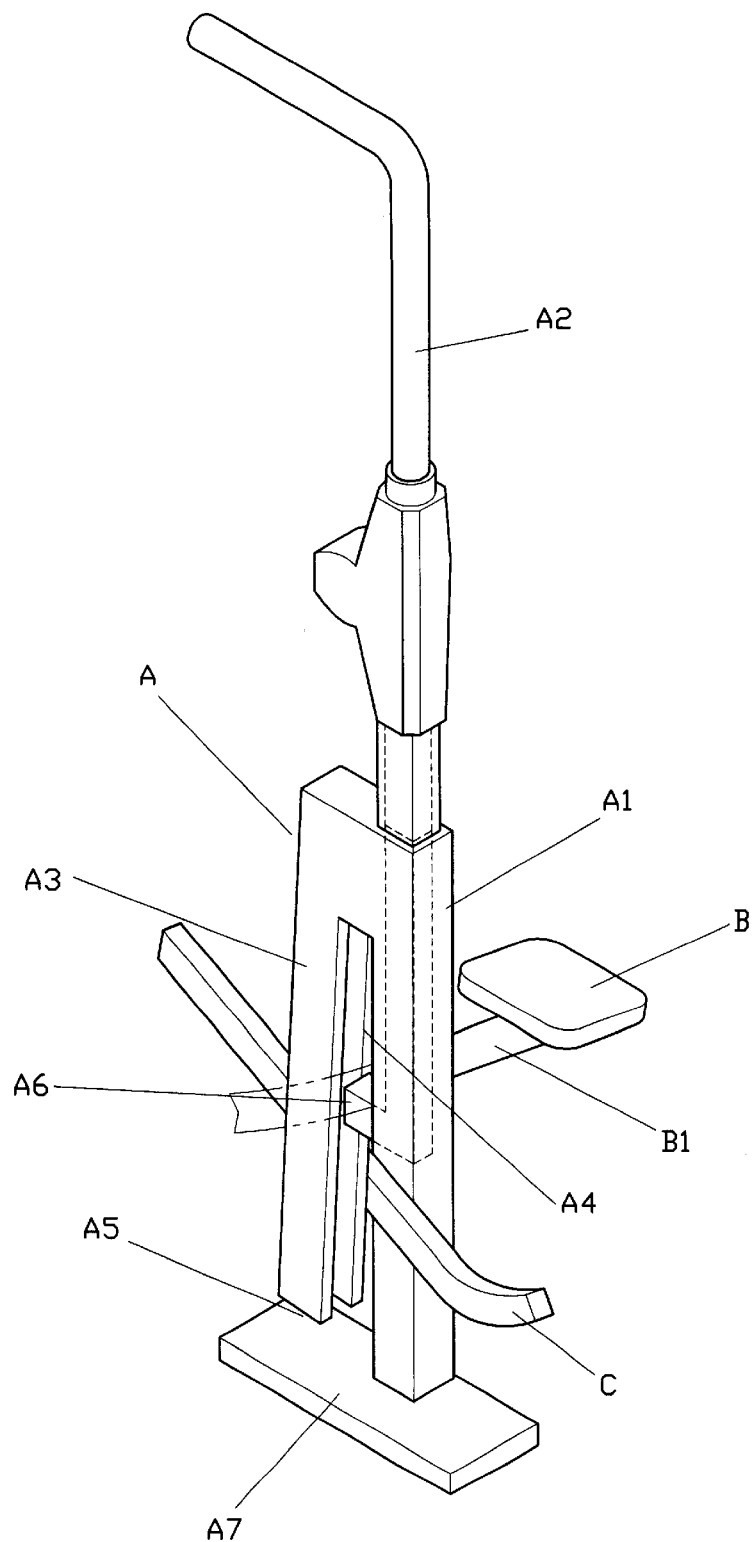
FIG. 6 is a perspective view showing a prior pedal lockset.

In use, as illustrated in FIGS. 4 and 5, it takes only to turn the handle (21) of the locking rod (2) outwardly for 90 degrees for the stopper (23) to be held in position at the gap (113) of the slipway (111) of the primary locking pipe (11) while the gap (14) at the lower end of the trough (13)

indicates opening status. The lockset (1) is then vertically moved to where below a connection rod (B1) of a brake pedal (B),(or a clutch pedal) and the gap (14) below the trough (13) locks onto the connection rod (B1) of the brake pedal (B) for the connection rod (B1) to be confined in the trough (13). The handle (21) of the locking rod (2) is then gripped to turn inwardly for 90 degrees to allow the stopper (23) return to where held in position to close up the gap (14). Meanwhile, the stopper (23) is located at the gaps (113, 123) of the slipways (111, 121) of the primary and the secondary locking is pipes (11, 12) with both circular channels (24) of the stopper (23) to be caulked to the two walls (112, 122) on both sides of the slipways (111, 121) of the primary and the secondary locking pipes (11,12) to block up the trough (13) and to lock up the connection rod (B1) of the brake pedal (B) inside the trough (13). The locking rod (2) in the primary locking pipe (11) is pulled up until the stopper (23) is entirely held against where below the connection rod (B1) of the brake pedal (B) as illustrated in FIG. 5. Accordingly, the restriction slots (22) of the locking rod (2) are at the same time secured by the locking cylinder (15) on the primary locking pipe (11) while both of the retainers (114, 124) at the lower ends of the two slipways (111, 121) of the primary and the secondary locking pipes (11, 12) are held against the floor in the car to prevent the brake pedal from being depressed, meaning the car cannot be moved for burglar proof. Should the burglar attempt to use a prying means such as a prying bar (C) to force into the trough (13) to force open the secondary locking pipe (12) using the primary locking pipe (11) as a support, such attempt is frustrated because that the two circular channels (24) of the stopper (23) are respectively caulked into where between said two walls (112, 122) on both sides of the two slipways (111, 121) of the primary and the secondary locking pipes (11, 12), and that the two walls (112, 122) on both sides of said two slipways (111, 121) are held tightly against the inner walls of the two circular channels (24) of the stopper (23) for the stopper (23) to withstand extremely large pull without being broken up so to connect and secure both of the primary and the secondary locking pipes (11, 12), therefore, the lockset (1) is prevented from being deformed due to forced prying to warrant it burglar-proof purpose.

As disclosed, the present invention gives indeed the following advantages:

1. As it permits vertical entry to lock onto the connection rod of the brake pedal (or the clutch pedal), the lockset is free of operation impedance due to contact other components in the car as observed during lateral locking up process.

2. It provides reliable burglar proof results by taking advantage of having said two walls on both sides of the slipways to hold tightly against inner walls of the two circular channels of the stopper, both of the primary and the secondary locking pipes are firmly joined and secured to prevent prying by forced entry.

I claim:

1. An automobile pedal lockset with vertical entry comprising a lockset and a locking rod, wherein, the lockset includes a primary locking pipe; a secondary locking pipe being fixed to one side of the primary locking pipe; a slipway provided on an opposite inner side of each of the primary and secondary locking pipes; a pair of retainers being respectively provided at a lower end of the primary and secondary locking pipes; and a locking cylinder provided on an upper end of the primary locking pipe, the locking rod being placed in the primary locking pipe of the lockset and a stopper being fixed to a lower end of the locking rod, characterized by that a trough being formed between the primary and the secondary locking pipes, and the trough directly connecting between both of the two retainers with a gap formed between the two retainers, and two circular channels being respectively provided on opposing sides of the stopper.

2. The automobile pedal lockset with vertical entry as claimed in claim 1, wherein, a wall is each provided on opposing sides of the slipway of each of the primary and secondary locking pipes.

3. The automobile pedal lockset with vertical entry as claimed in claim 1, wherein, a gap is laterally provided on one side of a lower end of each of the slipways of the primary and secondary locking pipes.

* * * * *